(12) United States Patent
Yamafuji et al.

(10) Patent No.: US 6,488,748 B2
(45) Date of Patent: Dec. 3, 2002

(54) CANISTER STRUCTURE FOR INTERNAL COMBUSTION ENGINE

(75) Inventors: Takahiro Yamafuji, Yokohama (JP); Yuji Itakura, Milton Keynes (GB)

(73) Assignee: Nissan Motor Co., Ltd., Yokohama (JP)

(*) Notice: Subject to any disclaimer, the term of this patent is extended or adjusted under 35 U.S.C. 154(b) by 42 days.

(21) Appl. No.: 09/749,765

(22) Filed: Dec. 28, 2000

(65) Prior Publication Data

US 2001/0020418 A1 Sep. 13, 2001

(30) Foreign Application Priority Data

Dec. 28, 1999 (JP) .............................. 11-372877

(51) Int. Cl.$^7$ .............................................. B01D 53/02
(52) U.S. Cl. .............................. 96/131; 96/132; 96/135; 96/144; 123/519
(58) Field of Search .................... 123/519; 95/146; 55/385.3; 96/121, 130, 131, 132, 134, 135, 143, 144, 142, 147

(56) References Cited

U.S. PATENT DOCUMENTS

| | | | | |
|---|---|---|---|---|
| 3,730,158 A | * | 5/1973 | St. Amand | |
| 3,844,739 A | * | 10/1974 | Alfrey, Jr. | |
| 4,306,894 A | * | 12/1981 | Fukami et al. | |
| 4,381,929 A | * | 5/1983 | Mizuno et al. | |
| 4,386,947 A | * | 6/1983 | Mizuno et al. | |
| 4,496,379 A | * | 1/1985 | Kozawa | |
| 5,173,095 A | * | 12/1992 | Yasukawa et al. | |
| 5,207,808 A | * | 5/1993 | Haruta et al. | |
| 5,304,235 A | * | 4/1994 | Watanabe et al. | |
| 5,393,329 A | * | 2/1995 | Inagaki et al. | |
| 5,408,976 A | * | 4/1995 | Reddy | |
| 5,538,542 A | * | 7/1996 | Watanabe et al. | |
| 5,538,543 A | * | 7/1996 | Watanabe et al. | |
| 5,564,398 A | * | 10/1996 | Maeda et al. | |
| 5,645,036 A | * | 7/1997 | Matsumoto et al. | |
| 5,851,268 A | * | 12/1998 | Hyodo et al. | |
| 5,914,457 A | * | 6/1999 | Itakura et al. | |
| 2001/0015134 A1 | * | 8/2001 | Uchino et al. | |
| 2001/0020418 A1 | * | 9/2001 | Yamafuji et al. | |
| 2002/0020398 A1 | * | 2/2002 | Kimoto et al. | |

FOREIGN PATENT DOCUMENTS

| | | | |
|---|---|---|---|
| JP | 57-176351 | * | 10/1982 |
| JP | 63-117155 | * | 5/1988 |
| JP | 64-176650 | * | 7/1988 |
| JP | 64-67222 | * | 3/1989 |
| JP | 5-231249 | * | 9/1993 |
| JP | 10-339218 | | 12/1998 |
| JP | 2001-182631 | * | 7/2001 |
| JP | 2001-248504 | * | 9/2001 |

* cited by examiner

*Primary Examiner*—Duane S. Smith
(74) *Attorney, Agent, or Firm*—Foley & Lardner (57) ABSTRACT

The present invention is accomplished by a canister structure for an internal combustion engine that includes a container having a gas passage therein through which gas containing evaporative fuel flows from a first end to a second end, a purge portion disposed on the container and connected to the first end through which vacuum pressure is applied into the gas passage, a charge portion disposed on the container and connected to the first end through which the gas is introduced into the gas passage, a drain portion disposed on the container and connected to the second end through which the gas passage is made open to the atmosphere, and an adsorbent material, disposed in the gas passage, to temporarily adsorb the evaporative fuel, whose specific heat on the side of the second end is made higher relative to that on the side of the first end.

7 Claims, 5 Drawing Sheets

CANISTER STRUCTURE FOR INTERNAL COMBUSTION ENGINE

The contents of Japanese Patent Application No. 11-372877, with a filing date of Dec. 28, 1999, in Japan, is incorporated by reference herein, in its entirety.

BACKGROUND OF THE INVENTION

The present invention generally relates to a canister structure preferably used for an internal combustion engine of a motor vehicle.

An internal combustion engine that combusts gasoline as a fuel usually has a canister to reduce the amount of evaporative fuel (or HC) released into the atmosphere.

The canister generally has a charge portion through which the evaporative fuel is introduced into the canister and a purge portion through which a vacuum pressure is applied into the canister, and these are disposed at a first end portion of the canister. The canister also has a drain portion at a second end portion thereof, through which the canister is open to the atmosphere.

The canister adsorbs the evaporative fuel introduced through the charge portion by means of adsorbent material disposed therein. In a predetermined engine operating condition, the atmospheric air is introduced into the canister through the drain portion, and adsorbed HC is thereby desorbed from the adsorbent material. In this manner, the atmospheric air purges the adsorbed HC off the adsorbent material. The evaporative fuel purged from the canister is sucked into an air intake system of the internal combustion engine through the purge portion, accompanied with the atmospheric air, and is combusted in the internal combustion engine.

Since the adsorption/desorption of the evaporative fuel is an exothermic/endothermic reaction respectively, the temperature of the adsorbent material increases when it adsorbs the evaporative fuel and the higher temperature tends to lower the adsorbence (i.e. the capability of adsorbing) of the adsorbent material. Conversely, the temperature of the adsorbent material decreases when it desorbs the adsorbed HC and the lower temperature tends to lower the desorbence (i.e. the capability of desorbing) of the adsorbent material.

Considering these characteristics of the adsorbent material, it is known, in the prior art, to lesser the decrease in the adsorbence and the desorbence by increasing the specific heat of the adsorbent material for preventing the temperature thereof from changing as much as possible. Japanese Provisional Patent (Kokai) Publication No. 10-339218 (1998) discloses a kind of adsorbent material that is made of activated charcoal bound together with heat-storing particles having high thermal conductivity and high heat capacity uniformly on the surface of the activated charcoal in order to increase the specific heat of the adsorbent material as a whole.

SUMMARY OF THE INVENTION

In the prior art described above, the adsorbent material cannot desorb all the adsorbed HC, and some amount of it remains adsorbed because the desorbence of the adsorbent material decreases as mentioned above, and further because of aging of the adsorbent material in the canister, or when the internal combustion engine is in a specific operating condition. Especially when the adsorbed HC remains near the drain portion, it migrates in the direction to the drain portion, forced by other evaporative fuel that is newly introduced from the charge portion. The remaining adsorbed HC that migrates to the drain portion may drain out of the canister, so that the amount of evaporative fuel released into the atmosphere may increase. This detracts from the most important characteristic of the canister, that is, reducing the amount of HC released into the atmosphere.

However, since the remaining HC adsorbed on any other part of the canister can be re-adsorbed downstream closer to the drain portion, when it migrates by newly introduced evaporative fuel, it causes few problems. Therefore, the amount of evaporative fuel released into the atmosphere by migration largely depends on the density of adsorbed HC (i.e. the amount of HC adsorbed in per unit amount of the adsorbent material) near the drain portion after a purge process has finished.

Some structural modifications to decrease the density of adsorbed HC mentioned above are considered, such as enlarging the capacity of the canister, or increasing the specific heat of the entire adsorbent material by binding heat-storing particles together uniformly on the surface thereof. However, these structures increase the desorbence of the adsorbent material even in parts of the canister other than near the drain portion, where it has no effect on the ability to reduce the amount of evaporated fuel released into the atmosphere. In considering the restriction concerning the size of the canister that is able to be equipped on the motor vehicle, such increase in size relatively restricts the improvement of the desorbence near the drain portion. Thus the evaporative fuel released into the atmosphere due to the migration cannot be reduced fully effectively although it makes more difficult to arrange the canister in the motor vehicle because of the increase in its size and also because of the corresponding increase in the cost of the canister.

Therefore, a general object of the invention is to provide an improved canister structure that alleviates one or more of the shortcomings discussed earlier herein.

An object of the invention is to provide a canister structure for an internal combustion engine that can provide an improved ability to reduce the amount of evaporated fuel released into the atmosphere, while also minimizing any increase in size and cost.

The above and other objects of the present invention can be accomplished by a canister structure for an internal combustion engine that includes a container having a gas passage therein through which gas containing evaporative fuel flows from a first end to a second end, a purge portion disposed on the container and connected to the first end through which vacuum pressure is applied into the gas passage, a charge portion disposed on the container and connected to the first end through which the gas is introduced into the gas passage, a drain portion disposed on the container and connected to the second end through which the gas passage is open to the atmosphere, and adsorbent material, disposed in the gas passage, to temporarily adsorb the evaporative fuel, whose specific heat on the side of the second end is made higher relative to that on the side of the first end.

It is essential that at least the adsorbent material disposed on the side of the second end has a specific heat higher than that on the side of the first end, thus the adsorbent material may be divided into a first adsorbent material disposed only on a purge and charge side of the gas passage and a second adsorbent material, which has a higher specific heat relative to the first adsorbent material, disposed only on a drain side of the gas passage.

In the preferred embodiment of the invention, the adsorbent material having a higher specific heat is made by mixing heat-storing material or activated charcoal having higher specific heat with the normal adsorbent material mainly made of activated charcoal.

According to one aspect of the present invention, since the adsorbent material having a higher specific heat disposed on the side of the drain portion prevents the temperature of the adsorbent material from changing due to the desorption of the adsorbed HC as much as possible, the canister can improve the desorbence of the adsorbent material, and reduce the amount (or the density) of the adsorbed HC remaining on the adsorbent material after purging. Therefore, the canister of the present invention can reduce the evaporated fuel released into the atmosphere due to the migration of the adsorbed HC.

Furthermore, when the second adsorbent material is disposed only on the side of the canister open to the atmosphere, and not disposed elsewhere, the necessary amount of the heat-storing material or the activated charcoal with a higher specific heat is lessened. Therefore, the canister can achieve the desired result, while the size and cost of the canister is kept as small as possible. The small size makes it easier to arrange the canister in the motor vehicle.

Generally speaking, as long as the same volume of adsorbent material is disposed, the smaller the sectional area of the gas passage is, the longer the length of the gas passage is made although the loss of pressure through the gas passage increases.

Therefore, it is preferable that a sectional area of the gas passage on the side of the second end is made smaller than that on the side of the first end. In this manner, the canister of the present invention can improve the desorbence of the adsorbent material near the drain portion, and reduce more effectively the amount of evaporated fuel released into the atmosphere by the migration.

As a way of narrowing the gas passage near the drain portion, the gas passage in the container may have a U-shape configuration. With the structure, the container can be made in a simple shape, such as a cylindrical or a box shape.

More particularly in this case mentioned above, it is preferable that the canister further includes a partition wall that divides the container into a larger chamber and a smaller chamber, where the smaller chamber is disposed on the side of the drain portion.

The canister of the present invention may further include a heat-insulating layer disposed in the gas passage, and the adsorbent material may be divided into a first adsorbent material disposed on the purge and charge side of the gas passage and a second adsorbent material, which has a higher specific heat relative to the first adsorbent material, disposed on the drain side of the gas passage. In this structure, the heat-insulating layer will be interposed between the first and second adsorbent material.

Through this structure, the heat-insulating layer can protect the second adsorbent material from being affected by the change of temperature of the first adsorbent material due to the desorption of the adsorbed HC. This reduces the temperature change of the second adsorbent material so that the desorbence of the second adsorbent material can be improved.

In the preferred embodiment of the invention, the heat-insulating layer is a heat-insulating filter made of foamed ceramic.

Further objects, features and advantages of the present invention will become apparent from the Detailed Description of Preferred Embodiments which follows when read in light of the accompanying figures and the claims.

DETAILED DESCRIPTION OF THE PREFERRED EMBODIMENTS

Hereinafter, preferred embodiments of the present invention are described in detail with reference to the attached drawings.

Figure 1:
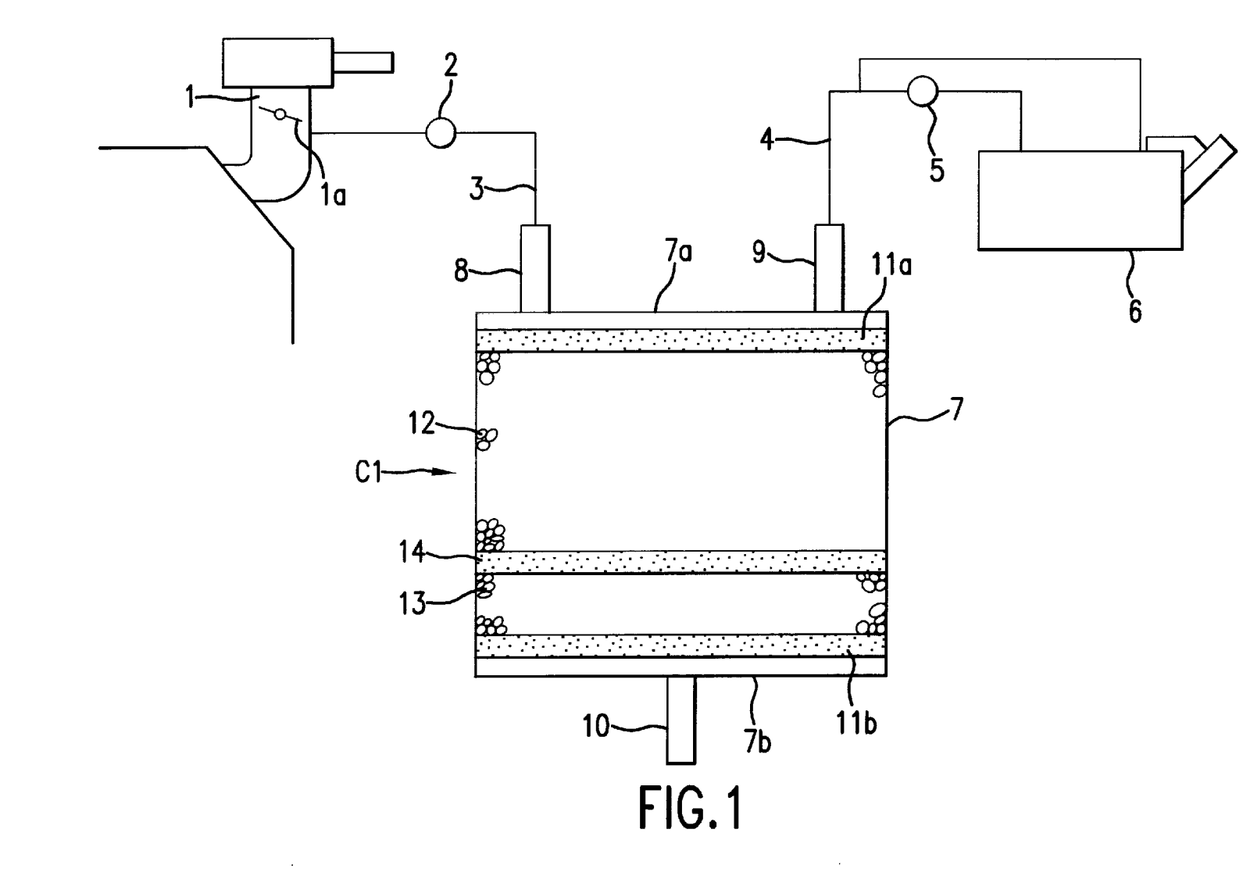
FIG. 1 is a schematic view of an evaporative fuel emission control system including a canister structure according to a first embodiment of the present invention.

FIG. 1 is a schematic view showing an evaporative emission control system having a canister C1 to which the present invention is applied as a first embodiment. The canister C1 mainly has a container 7 filled with adsorbent material 12, and 13 including activated charcoal. The container 7 forms a gas passage therein in which gas containing air and evaporative fuel flows from a top end (or a first end) to a bottom end (or a second end) of the container 7, or in the opposite direction. On a top surface 7a of the container 7 that forms a first end of the gas passage, there is provided a purge connector 8 as a purge portion through which a vacuum pressure generated in the air intake system is applied into the canister C1 and a charge connector 9 as a charge portion through which evaporative fuel is introduced into the canister C1.

The purge connector 8 is connected to an intake passage 1, by means of a purge passage 3, downstream from a throttle valve 1a that is located in the intake passage 1. A purge control valve 2 is provided on the purge passage 3.

On the other hand, the charge connector 9 is connected to a fuel tank 6 by means of a charge passage 4. A check valve 5 is provided on the charge passage 4 to regulate the pressure inside the fuel tank 6.

On a bottom surface 7b of the container 7 that forms a second end of the gas passage, there is provided a drain connector 10 as a drain portion of the canister C1 through which the canister is open to the atmosphere.

The evaporative emission control system described above operates as follows.

When the internal combustion engine is off, the highly pressurized gas in the fuel tank containing the evaporative fuel (because of its high temperature) opens the check valve 5, and the gas flows into the container 7 through the charge passage 4 and the charge connector 9. While the gas passes through the container 7, the evaporative fuel therein is temporarily adsorbed and the rest of the gas, which mainly comprises air, is released into the atmosphere through the drain connector 10.

After the internal combustion engine starts its operation and when the vacuum pressure is generated by the air intake in the intake passage 1, the purge control valve 2 opens, and then the vacuum pressure is applied into the container 7. Because of the vacuum pressure applied into the container 7, the atmospheric air is pulled into the container 7 through the drain connector 10. When the atmospheric air passes through the container 7, the adsorbed HC is desorbed from the adsorbent material 12 and 13, and the evaporative fuel is supplied to the intake passage 1 with the atmospheric air through the purge connector 8, and the purge passage 3. Then the evaporative fuel is combusted in the combustion chamber of the internal combustion engine.

The purge control valve 2 properly controls the amount of the evaporative fuel and the timing when to introduce it into the intake passage 1. The control valve 2 may be driven mechanically by the vacuum pressure generated in the intake system, or may be driven by an electric actuator controlled by electrical signals according to the engine operating condition.

In the first embodiment, the container 7 described above is formed in a simple hollow shape such as a cylindrical or box shape etc., and in the container 7, there is provided, in addition to the adsorbent material 12 and 13, two holding filters 11a and 11b (specifically, a first end filter 11a and a second end filter 11b), and a heat-insulating filter 14. These are laminated along the gas passage, and compressed properly from both ends of the gas passage by, for example, springs (not shown) so as to securely hold the adsorbent material 12 and 13 in the container 7.

The holding filters 11a and 11b are made of conventional nonwoven fabric or other filter material, and function to prevent the activated charcoal contained in the adsorbent material 12 and 13 from falling off. The heat-insulating filter 14 is disposed between the adsorbent material 12 and 13, and is used as a heat-insulating layer to prevent heat transmission between them as described later. The heat-insulating filter 14 is made of foamed ceramic, for example, that has better heat-insulating characteristics than the holding filters 11a and 11b.

The adsorbent material 12 and 13 mainly includes particles of activated charcoal mixed and distributed uniformly therein. For example, the adsorbent material 12 and 13 is made by mixing the particles of activated charcoal with binders, kneading them together, forming them into an adequate shape and heat-treating them.

Particularly in the first embodiment, the specific heat of the second adsorbent material 13 disposed near the drain connector 10, or on the side of the second end of the gas passage open to the atmosphere, is relatively higher than that of the first adsorbent material 12 disposed near the purge connector 8 and the charge connector 9, or on the side of the first end of the gas passage not open to the atmosphere.

In order to make the second adsorbent material 13 having higher specific heat, particles of materials with higher specific heat and higher thermal conductivity, such as some kinds of inorganic material like alumina and glass etc., and some kinds of metallic material like iron, copper, and lead etc., are mixed into the adsorbent 13 uniformly, or the adsorbent 13 is made of another kind of activated charcoal having relatively higher specific heat than that of the first adsorbent material 12.

As a result, the temperature of the second adsorbent material 13 with relatively higher specific heat changes much less so that the desorbence of the second adsorbent material is improved, and the amount (or the density) of adsorbed HC remaining in the second adsorbent material 13 is reduced. Therefore, the evaporative fuel released into the atmosphere due to the migration of the adsorbed HC on the adsorbent material is reduced effectively.

In the first embodiment, the heat-storing material or the activated charcoal with higher specific heat is mixed only with the second adsorbent material 13 disposed on the side of the second end of the gas passage open to the atmosphere, not with the first adsorbent material 12 disposed on the side of the first end not open to the atmosphere. In other words, the second adsorbent material 13 with higher specific heat relative to the first adsorbent material 12 is disposed only on the side of the canister open to the atmosphere, and not disposed elsewhere. In this structure, since the least amount of the heat-storing material or the activated charcoal with higher specific heat is used to obtain the desired result, the size and cost of the canister C1 is kept as small as possible, and it is easier to arrange the canister C1 on the motor vehicle because of its size.

Furthermore in the first embodiment, there is provided the heat-insulating filter 14 having a proper heat-insulating characteristic between the first adsorbent material 12 and the second adsorbent material 13. By way of the heat-insulating filter 14, the second adsorbent material 13 disposed on the side of the second end open to the atmosphere is protected from being affected by the change of temperature of the first adsorbent material 12 due to the desorption of the adsorbed HC. This reduces the temperature change of the second adsorbent material 13 so that the desorbence of the second adsorbent material is improved.

If the same amount of the heat-storing material or the activated charcoal with higher specific heat is mixed uniformly with the entirety of the adsorbent materials, the desorbence of the adsorbent material near the drain portion does not improve as much as the first embodiment, although it can be slightly improved as a whole. Thus, the evaporative fuel released into the atmosphere due to the migration is not reduced as much as the first embodiment. It is important that the second adsorbent material 13, which is disposed on the side of the second end of the gas passage, should have higher specific heat than the first adsorbent 12, which is disposed on the side of the first end of the gas passage. In this manner, the adsorbed HC that migrates to the second end of the gas passage and comes out of the canister C1 is reduced effectively, and any increase in the size of the canister C1 is minimized.

Figure 2:
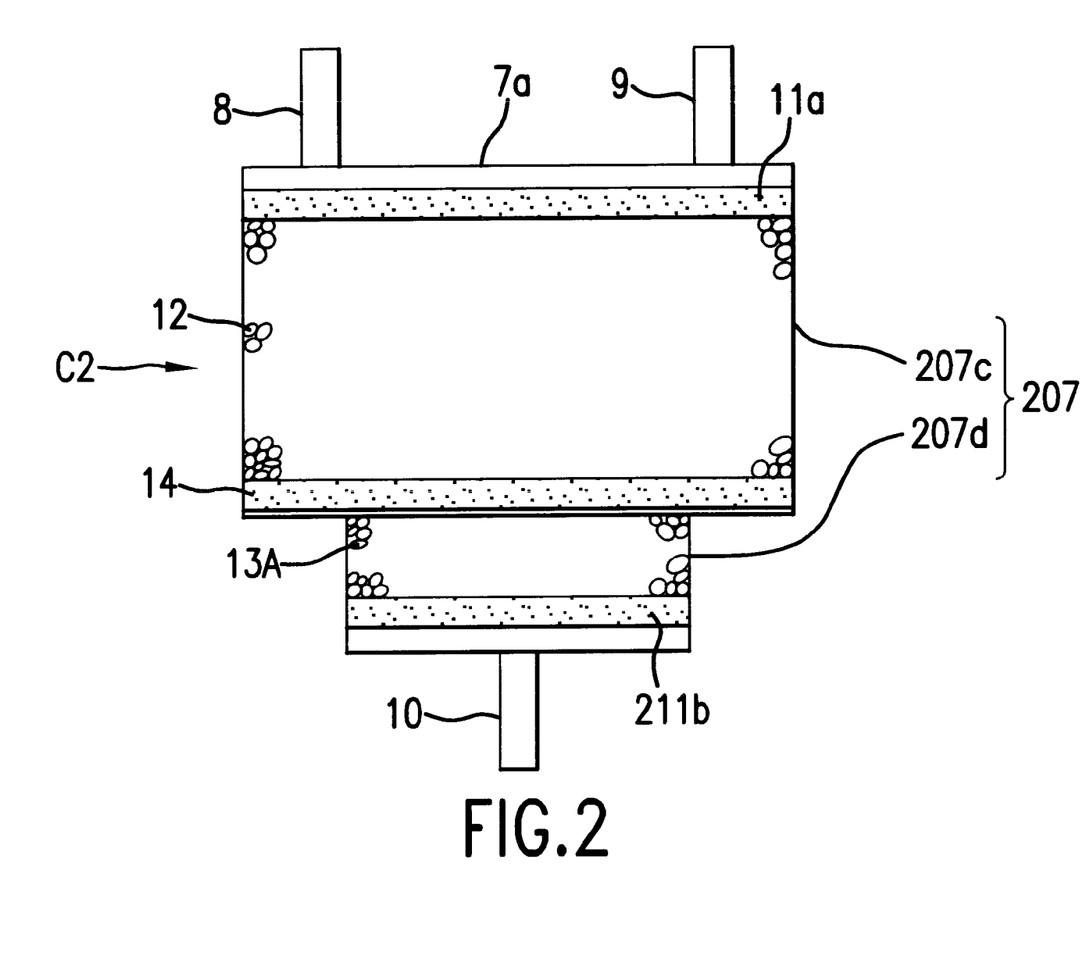
FIG. 2 is a cross sectional view of a canister showing an inner structure thereof according to a second embodiment of the present invention.
Figure 3:
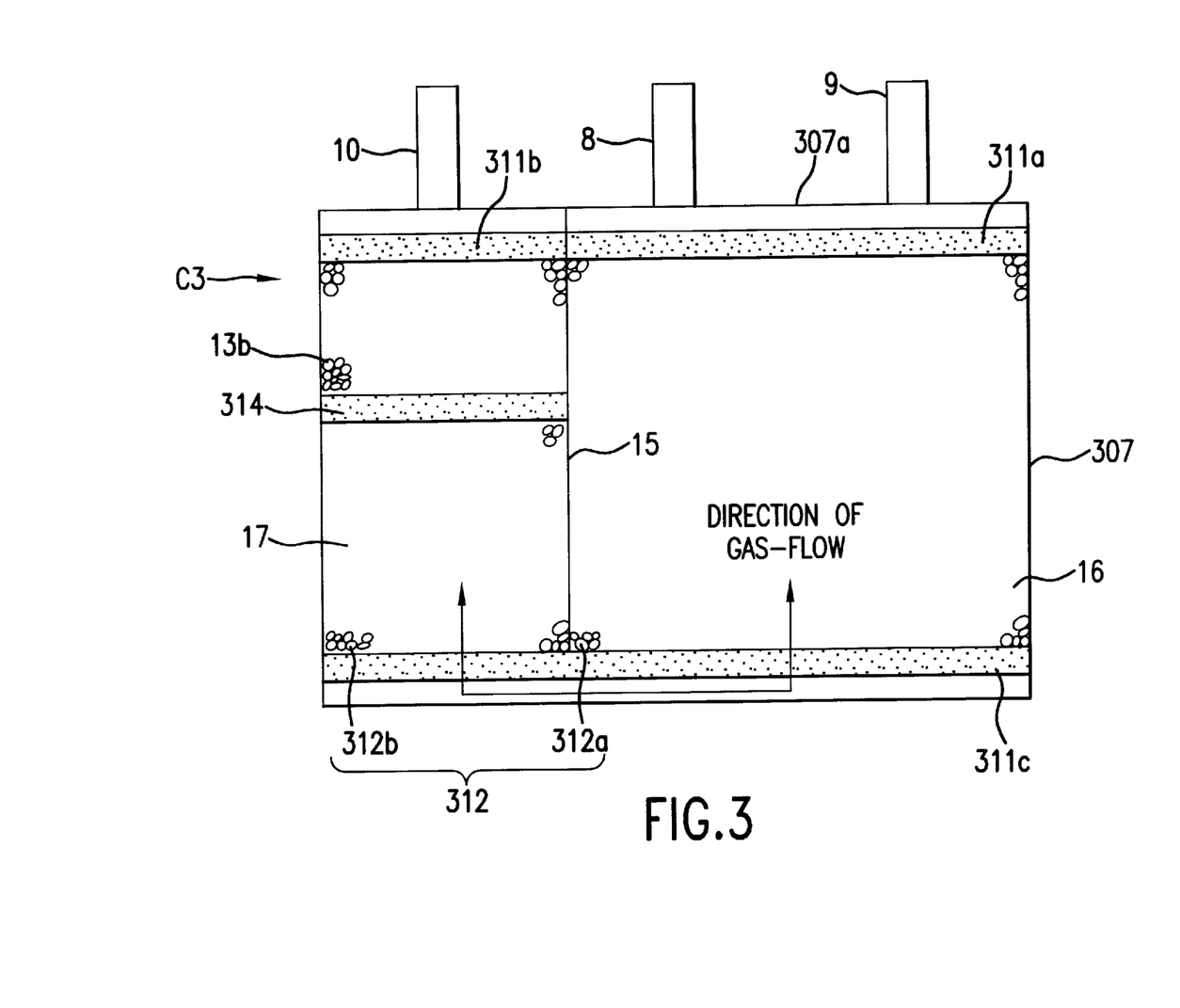
FIG. 3 is a cross sectional view of a canister showing an inner structure thereof according to a third embodiment of the present invention.

FIG. 2 and FIG. 3 show the structures of canisters corresponding to the other embodiments of the present invention. However, their structures are basically the same as the first embodiment, and the same reference numbers are put to the same components, and duplicate explanations regarding the similar components are omitted appropriately.

A canister C2 as a second embodiment disclosed in FIG. 2 is formed such that a sectional area of the gas passage, perpendicular thereto, at the side of the drain portion is made relatively smaller than that on another side of the gas passage. The canister C2 mainly has a container 207 filled with adsorbent material 12 and 13A including activated charcoal. Particular, a drain side container portion 207d, in which there is provided a second adsorbent material 12A and a second end filter 211b, has a relatively smaller width in comparison to a charge and purge side container portion 207c in which there is provided a first end filter 11a, a first adsorbent material 12, and a heat-insulating filter 14.

Assuming that there is provided the same amount of second adsorbent material 13A as the first embodiment, the smaller the sectional area of the gas passage is, the longer the length of the gas passage is made. As mentioned above, as long as the volume of the canister does not change, the longer the length of the gas passage is, the desorbence of the adsorbent material is correspondingly improved. Therefore, the desorbence of the adsorbent material is improved near the drain portion. This reduces the amount of remaining HC adsorbed near the drain portion after the purge of the canister and the supply of the evaporative fuel into the intake passage 1 has finished.

Generally, the longer the gas passage is, the greater the loss of pressure. However in the second embodiment, only the drain side container portion 207d, in which the higher desorbence is required, is made narrower. Thus, the decrease of the desorbence due to the longer gas passage is prevented.

FIG. 3 shows a canister C3 as a third embodiment of the present invention. In the third embodiment, the gas passage within the canister C3 is designed to form a U-shape. The canister C3 mainly has a container 307 filled with adsorbent material 312 and 13B including activated charcoal. According to FIG. 3, an inner space of the canister C3 is divided by a partition wall 15 into a larger chamber 16 and a smaller chamber 17. The larger chamber 16 is disposed on the side of the first end of the gas passage (right side in FIG. 3), while the smaller chamber 17 is disposed on the side of the second end of the gas passage (left side in FIG. 3). The purge connector 8 and the charge connector 9 are provided on the right part of a container surface 307a that faces to the larger chamber 16, and the drain connector 10 is provided on the left part that faces the smaller chamber 17. In this structure, the container surface 307a forms both first and second ends of the gas passage.

In the larger chamber 16, there is provided a first end filter 311a and the larger part of the first adsorbent material 312a with lower specific heat. In the smaller chamber 17, there is provided a second end filter 311b, the second adsorbent material 13B with higher specific heat, the heat-insulating filter 314, and the rest of the first adsorbent material 312b with the lower specific heat. Additionally, an intermediate filter 311c is provided at the bottom of the U-shaped gas passage as shown in FIG. 3 and supports the bottom of the first adsorbent material 312a, 312b. The intermediate filter 311c, like the holding filters 311a, 311b described above, keeps the first adsorbent material 312a, 312b in the central portion of the canister 7.

In the third embodiment described above, similar to the second embodiment, since the gas passage is made longer on the side of the second end by narrowing the width thereof, maintaining the total amount of the second adsorbent material 13B, the desorbence of the adsorbent material is improved locally on the side of the second end of the gas passage. Furthermore, the U-shaped gas passage is achieved by the partition wall 15 disposed in the container 307. Since the container 307 is made in a simple shape, such as, for example, a cylindrical or a box shape, the canister C3 is easily disposed on the motor vehicle.

Figure 4A:
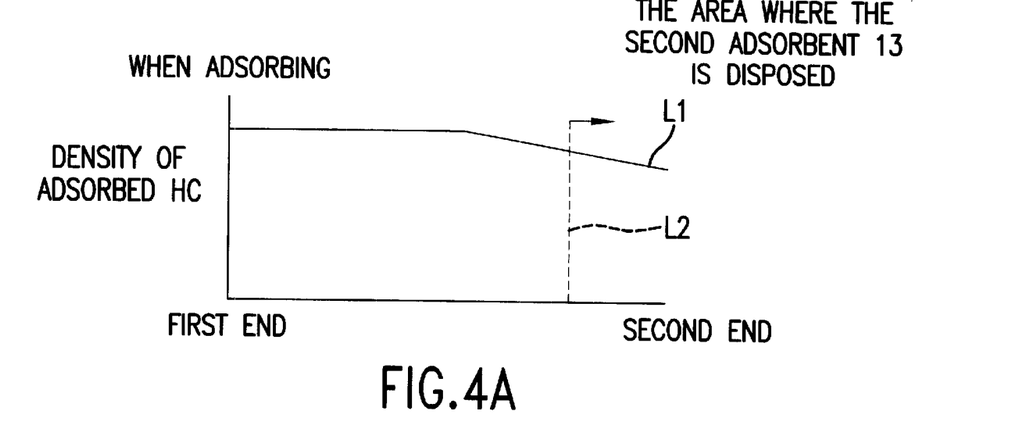
FIGS. 4A–4C are graphs showing a distribution of the density of adsorbed HC along a gas passage in the canister.
Figure 4B:
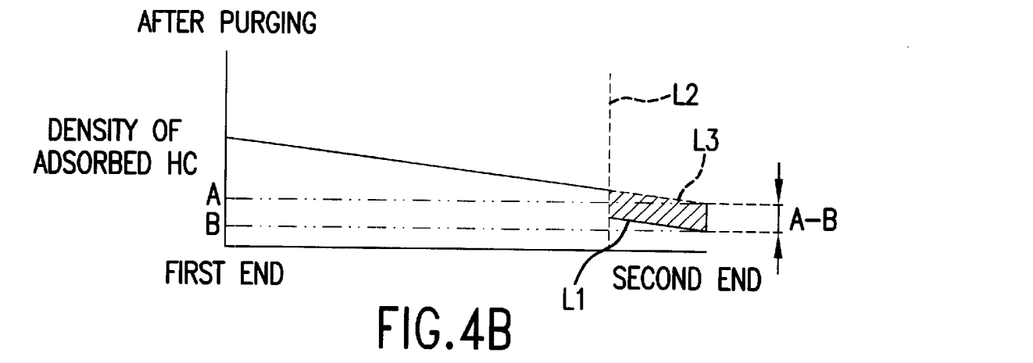
Figure 4C:
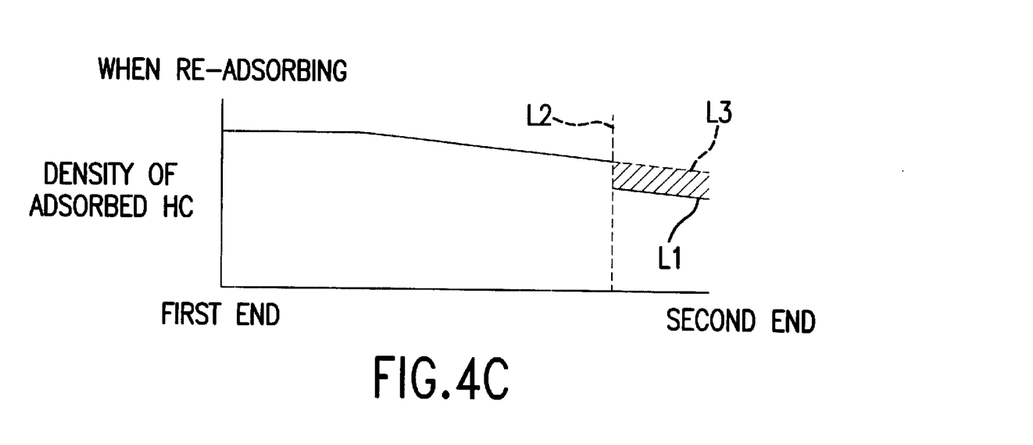

FIGS. 4A–4C are graphs each showing distribution of the density of the adsorbed HC on the adsorbent material along the gas passage in the canister. The left side of FIGS. 4A–4C represents the first end of the gas passage, while the right side represents the second end. As shown in these graphs, the density of HC (i.e. evaporative fuel) adsorbed on the activated charcoal contained in the adsorbent material is generally the highest at the first end and gets lower to the second end.

Solid lines L1 in FIGS. 4A–4C show characteristics of the present invention. Broken lines L2 show boundaries where the adsorbent material is divided into two portions, one with the lower specific heat (i.e. the first adsorbent material) and the other with the higher specific heat (i.e. the second adsorbent material) in the gas passage; the boundaries correspond to the position in the gas passage where the heat-insulating filters in FIGS. 1–3 are disposed. A broken lines L3 show characteristics of the prior art that the adsorbent material with higher specific heat is not disposed anywhere.

As clearly shown in FIGS. 4A–4C, in the area where the second adsorbent is located, the density of the adsorbed HC is locally reduced relative to the prior art (refer to the hatched area by solid lines). Particularly at the second end of the gas passage on the drain side, the density of the adsorbed HC is the most reduced, by the amount of (A−B) in comparison to the prior art.

Figure 5:
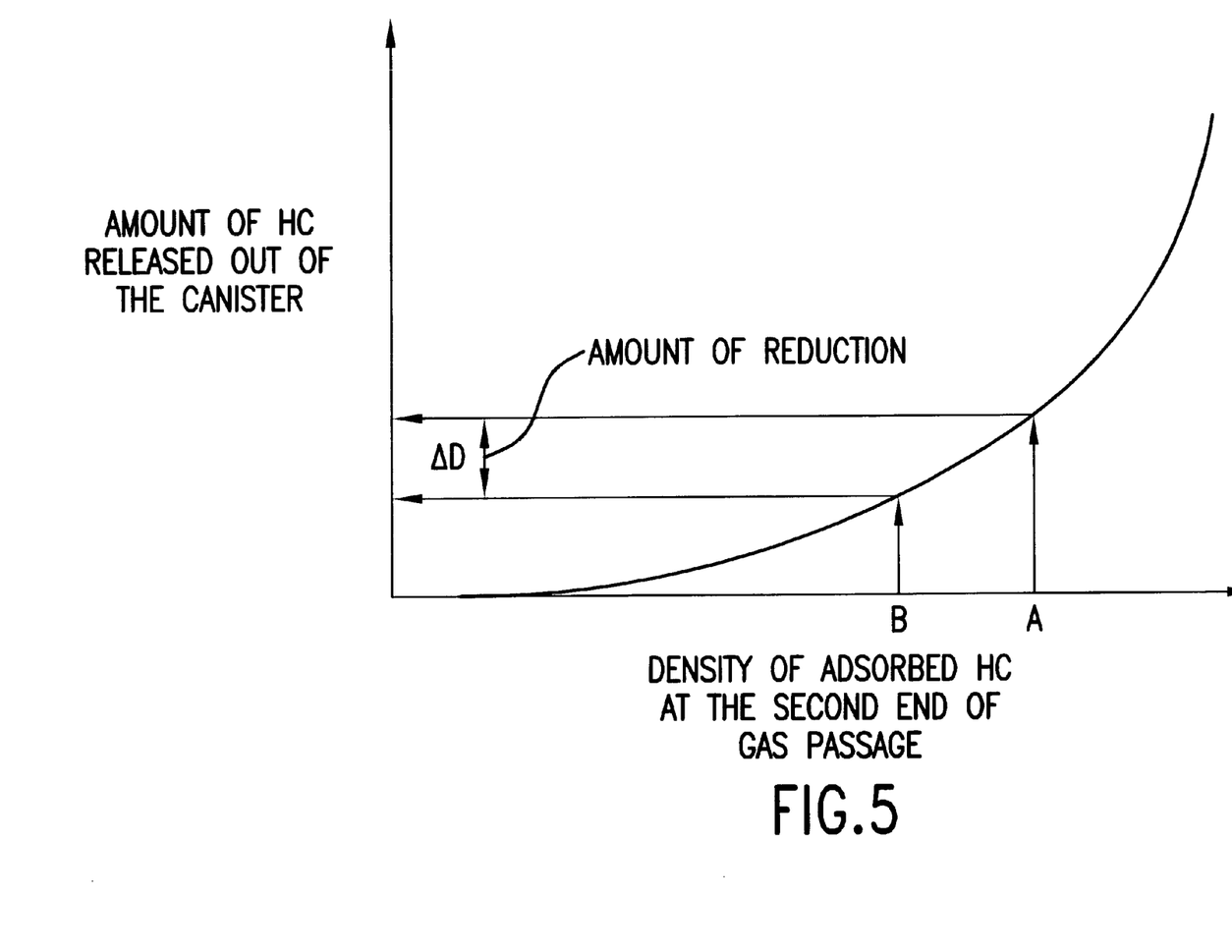
FIG. 5 is a graph showing a relationship between the density of adsorbed HC at the second end and an amount of HC released out of the canister as evaporative fuel.

FIG. 5 is a graph showing a relationship between the density of HC at the second end of the gas passage (represented by the horizontal axis) and the amount of adsorbed HC (i.e. evaporative fuel) released out of the canister (represented by the vertical axis). As shown in this figure, the amount of adsorbed HC released out of the canister tends to increase according to the increase of the density of the adsorbed HC at the second end of the gas passage. Therefore, the amount of HC released out of the canister is reduced by ΔD relative to the prior art when the density of the adsorbed HC at the second end of the gas passage is reduced by (A−B), as mentioned above.

Although the present invention has been described above by reference to certain embodiments of the invention, the invention is not limited to the embodiments described above. Modifications and variations of the embodiments described above will occur to those skilled in the art, in light of the above teachings, and those modifications and embodiments are considered to a part of the present invention.

For example, the heat-insulating filter may be omitted, and/or the adsorbent material may be disposed so that the specific heat thereof increases gradually from the first end to the second end of the gas passage. Alternatively, as would be recognized by those skilled in the art, although the first adsorbent material, the second adsorbent material, and the heat-insulating filter are laminated by inserting the heat-insulating filter between the first and second adsorbent material in the three embodiments described above.

The scope of the present invention is defined with reference to the following claims.

What is claimed is:

1. A canister structure for an internal combustion engine comprising:

a container having a gas passage therein through which gas containing evaporative fuel flows from a first end to a second end;

a purge portion disposed on the container and connected to the first end, through which vacuum pressure is applied into the gas passage;

a charge portion disposed on the container and connected to the first end, through which the gas is introduced into the gas passage;

a drain portion disposed on the container and connected to the second end, through which the gas passage is open to the atmosphere; and an adsorbent material, disposed in the gas passage, to temporarily adsorb the evaporative fuel, wherein specific heat of the adsorbent material on the side of the second end is made higher relative to that on the side of the first end.

2. The canister structure for an internal combustion engine as claimed in claim 1, wherein a sectional area of the gas passage on the side of the second end is smaller than that on the side of the first end.

3. The canister structure for an internal combustion engine as claimed in claim 1, wherein the gas passage in the container has a U-shape configuration.

4. The canister structure for an internal combustion engine as claimed in claim 3, further comprising a partition wall that divides the container into a larger chamber and a smaller chamber, wherein the smaller chamber is disposed on the side of the drain portion.

5. The canister structure for an internal combustion engine as claimed in claim 1, further comprising a heat-insulating layer disposed in the gas passage, wherein the adsorbent material is divided into a first adsorbent material disposed on a purge and charge side of the gas passage and a second adsorbent material, which has a higher specific heat relative to the first adsorbent material, disposed on a drain side of the gas passage, and the heat-insulating filter is interposed between the first and second adsorbent material.

6. The canister structure for an internal combustion engine as claimed in claim 5, wherein the heat-insulating layer is a heat-insulating filter made of foamed ceramic.

7. A canister structure for an internal combustion engine comprising:

a container having a gas passage therein through which gas containing evaporative fuel flows from a first end to a second end;

a purge portion disposed on the container and connected to the first end, through which vacuum pressure is applied into the gas passage;

a charge portion disposed on the container and connected to the first end, through which the gas is introduced into the gas passage;

a drain portion disposed on the container and connected to the second end, through which the gas passage is open to the atmosphere; and an adsorbent material, disposed in the gas passage, to temporarily adsorb the evaporative fuel, wherein the adsorbent material is divided into a first adsorbent material disposed on a purge and charge side of the gas passage and a second adsorbent material, which has a higher specific heat relative to the first adsorbent material, disposed only on a drain side of the gas passage.

* * * * *